(12) United States Patent
Zhao et al.

(10) Patent No.: US 8,736,209 B2
(45) Date of Patent: May 27, 2014

(54) DRIVE AND CONTROL CIRCUIT FOR MOTOR SYSTEM AND THE METHOD THEREOF

(75) Inventors: Jian Zhao, Hangzhou (CN); Yike Li, Chengdu (CN); Yangwei Yu, Hangzhou (CN)

(73) Assignee: Chengdu Monolithic Power Systems, Co., Ltd., Chengdu (CN)

( * ) Notice: Subject to any disclaimer, the term of this patent is extended or adjusted under 35 U.S.C. 154(b) by 204 days.

(21) Appl. No.: 13/457,845

(22) Filed: Apr. 27, 2012

(65) Prior Publication Data

US 2012/0274247 A1 Nov. 1, 2012

(30) Foreign Application Priority Data

Apr. 29, 2011 (CN) .......................... 2011 1 0110111

(51) Int. Cl.
*H02P 6/00* (2006.01)

(52) U.S. Cl.
USPC ............ 318/400.29; 318/400.01; 318/400.08; 318/667; 318/400.26; 318/641; 315/185 R; 315/209 R; 315/315; 315/307; 315/67 R; 315/177; 315/199; 361/695; 363/16

(58) Field of Classification Search
USPC .......... 318/400.01, 400.08, 667, 400.26, 641, 318/400.29; 315/185 R, 291, 294, 209 R, 315/224, 307, 315, 192; 310/67 R, 177, 310/179; 361/695; 363/16; 219/497, 501, 219/510, 515

See application file for complete search history.

(56) References Cited

U.S. PATENT DOCUMENTS

| | | | | |
|---|---|---|---|---|
| 6,014,004 | A * | 1/2000 | Hamaoka et al. | 318/778 |
| 6,147,465 | A * | 11/2000 | Hollenbeck | 318/400.26 |
| 2005/0151500 | A1* | 7/2005 | Akiyama | 318/650 |
| 2010/0033064 | A1* | 2/2010 | Tanaka et al. | 310/67 R |
| 2010/0307782 | A1* | 12/2010 | Iwata et al. | 173/1 |
| 2012/0062159 | A1 | 3/2012 | Li et al. | |

* cited by examiner

*Primary Examiner* — Eduardo Colon Santana
*Assistant Examiner* — Jorge L Carrasquillo
(74) *Attorney, Agent, or Firm* — Perkins Coie LLP

(57) ABSTRACT

A drive and control circuit for motor system and the method thereof are disclosed. The motor system could be applied in a cooling device, wherein the motor system comprises a rotor, a coil and a bridge circuit. The drive and control circuit comprises a control unit, a state detecting circuit, a load determining circuit, and a startup setting circuit. The startup setting circuit makes the motor run with the maximum torque, thus to make the motor system start up easily and quickly. The load determining circuit detects the load of the motor system, thus to generate a load determining signal to determine the speed of the motor system. The control unit could be realized with few components so as to save the costs.

17 Claims, 5 Drawing Sheets

DRIVE AND CONTROL CIRCUIT FOR MOTOR SYSTEM AND THE METHOD THEREOF

CROSS-REFERENCE TO RELATED APPLICATION(S)

This application claims priority to and the benefit of Chinese Patent Application No. 201110110111.4, filed Apr. 29, 2011, which is incorporated herein by reference in its entirety.

TECHNICAL FIELD

The present disclosure relates generally to motor drive and control circuits and the method thereof, and more particularly but not exclusively to motor drive and control circuits which could startup a motor system with maximum torque and the method thereof.

BACKGROUND

In real applications, motors often fail to start up with heavy load because of insufficient torque. There is a need to optimize the utilization of the power source to successfully start the motor and thereby shorten the transition time from stillness to rated speed.

FIG. 1 shows a prior art drive and control circuit for a motor system. In FIG. 1, the drive and control circuit comprises a control circuit 101 and a power stage. The power stage comprises four switches SW1, SW2, SW3 and SW4. The control circuit 101 generates four control signals PWM1, PWM2, PWM3 and PWM4 to respectively control the four switches SW1, SW2, SW3 and SW4. The operation is: when the switches SW1 and SW4 are turned ON by the control signals PWM1 and PWM4, the switches SW2 and SW3 are turned OFF by the control signals PWM2 and PWM3, thus the current flowing through the motor 102 flows in direction a as shown in FIG. 1; when the switches SW2 and SW3 are turned ON by the control signals PWM2 and PWM3, the switches SW1 and SW4 are turned OFF by the control signals PWM1 and PWM4, thus the current flowing through the motor 102 flows in direction b as shown in FIG. 1. By alternatively changing the direction of the current flowing through the motor 102, the motor 102 runs with a fixed direction.

During when the current flowing through the motor 102 flows in direction a, the switch SW4 stays ON, and the switch SW1 is turned ON and OFF at a frequency of 25 kHz. Similarly, during when the current flowing through the motor 102 flows in direction b, the switch SW3 stays ON, and the switch SW2 is also turned ON and OFF at a frequency of 25 kHz.

FIG. 2 shows waveforms of signals in the circuit of FIG. 1. In FIG. 2, "Vcosc" represents a sawtooth signal and "Vth" represents a reference signal. "Speed" represents a pulse signal, and the frequency of the pulse signal is proportional to the speed of the motor. The sawtooth signal Vcosc is compared with the reference signal Vth to generate a control signal PWM. Persons of ordinary skill in the art should know that the control signal PWM is corresponding to the control signals PWM1 or PWM2 in FIG. 1. When the sawtooth signal Vcosc is fixed, the pulse width of the control signal PWM is determined by the reference signal Vth. As shown in FIG. 2, when the reference signal Vth is lower than the sawtooth signal Vcosc, the duty cycle of the control signal PWM could even be 100%, thus resulting in a maximum motor torque, and thereby resulting in a maximum motor speed.

In real applications, the motor is expected to start up quickly so as to shorten the transition time from stillness to rated speed. Thus the duty cycle of the control signal PWM should be sufficient enough to achieve a maximum torque when the motor starts up.

FIG. 3 shows the waveforms of signals in a conventional system with a control signal PWM having variable duty cycle. When the reference signal Vth is lower than the sawtooth signal Vcosc in the startup interval in FIG. 3, the control signal PWM has a 100% duty cycle, thereby the motor starts up with a high torque and gets started up easily and quickly. After the startup interval, the motor enters a steady state. The duty cycle of the control signal PWM changes to a set value determined by the changed reference signal Vth, and the speed of the motor is proportional to the duty cycle of the control signal PWM.

FIG. 4 shows the waveforms of signals in a conventional system with a control signal PWM having a fixed duty cycle. As shown in FIG. 4, the duty cycle of the control signal PWM starts directly from a set value determined by the constant reference signal Vth. Thereby the motor has a much smaller torque than that in FIG. 3, resulting in a much longer transition time from stillness to rated speed. If started up with a heavy load, the motor may fail to start up due to insufficient torque.

SUMMARY

The details and the advantages of the embodiments in accordance with the present disclosure are described in the following description. Many additional embodiments will be apparent to persons of ordinary skill in the art by reading this disclosure or by practicing the embodiments of the present disclosure.

The present disclosure discloses a method which could startup a motor system with maximum torque in a short time.

The method could startup a BLDC (Brushless DC) motor system with maximum torque.

The present disclosure discloses a method of determining the load of the motor system, and controlling the speed of the motor system based on thereupon.

The present disclosure discloses a drive and control circuit for motor system, comprising: a state detecting circuit configured to detect the state (run/stop) of the motor system, to provide a state detecting signal based thereupon; a load determining circuit configured to detect the ambient temperature of a fan driven by the motor system, to determine the load of the motor system and to generate a load determining signal based thereupon; and a startup setting circuit configured to generate a startup setting signal based on the operation of the motor system, and to generate a second control signal based on the startup setting signal, the load determining signal and the state detecting signal; and a control unit configured to control the operation of the motor system based on the state detecting signal and the second control signal. The startup setting circuit generates the startup setting signal when the motor system starts up, to make sure that the motor system starts up with a maximum torque.

The present disclosure discloses a method of starting up a motor system with maximum torque, comprising: generating a state detecting signal by a state detecting circuit based on the state of the motor system, wherein the state of the motor system comprising a running state and a stop state; generating a load determining signal by a load determining circuit based on an ambient temperature of the fan driven by the motor system; generating a startup setting signal by a startup setting circuit when the motor system starts up; generating a second logic signal by a control unit based on the state detecting signal, the load determining signal and the startup setting signal; and generating control signals to control the bridge circuit of the motor system based on the second logic signal and the state detecting signal. The startup setting signal is provided when the motor system starts up, to make sure that the motor system starts up with a maximum torque.

The drive and control circuit in accordance with the embodiments of the present disclosure drive the motor system with a maximum torque during the startup period and the restart period, thereby shorten the transition time from stillness to rated speed. In addition, the drive and control circuit is simplified and fewer external components are needed, so the cost is down.

DETAILED DESCRIPTION

In the present disclosure, numerous specific details are provided, such as examples of circuits, components, and methods, to provide a thorough understanding of embodiments of the disclosure. Persons of ordinary skill in the art will recognize, however, that the disclosure can be practiced without one or more of the specific details. In other instances, well-known details are not shown or described to avoid obscuring aspects of the disclosure.

It is to be understood in these letters patent that the meaning of "A" is coupled to "B" is that either A and B are connected to each other as described below, or that, although A and B may not be connected to each other as described below, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

Figure 1:
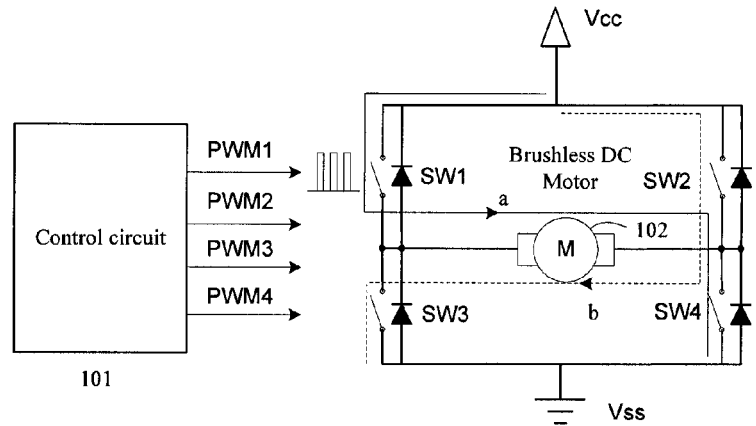
FIG. 1 shows a prior art drive and control circuit for a motor system.
Figure 2:
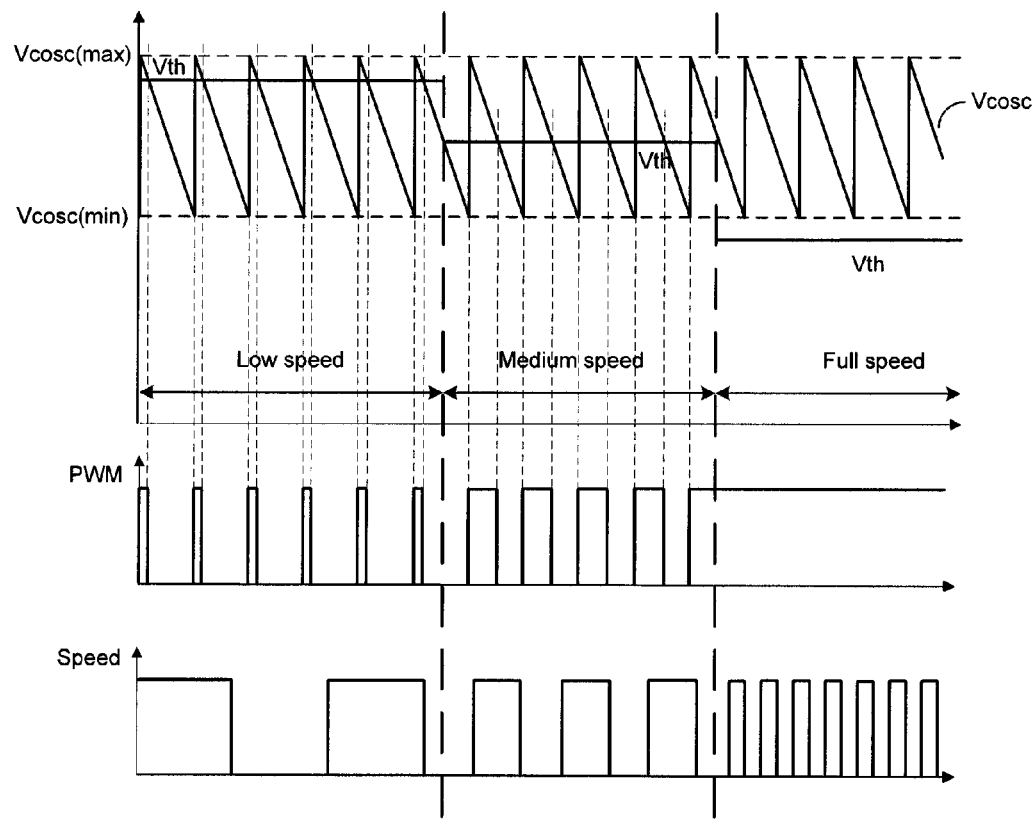
FIG. 2 shows waveforms of signals in the circuit of FIG. 1.
Figure 3:
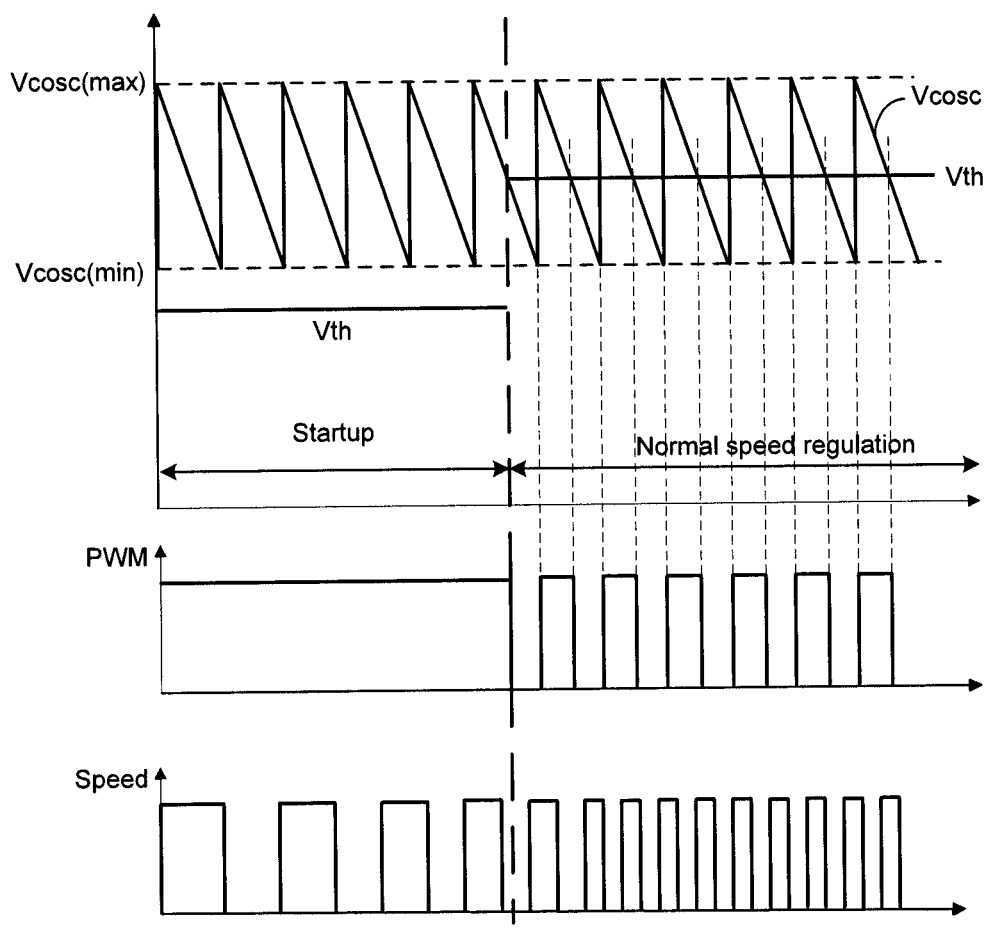
FIG. 3 shows the waveforms of signals in a conventional system with a control signal PWM having variable duty cycle.
Figure 4:
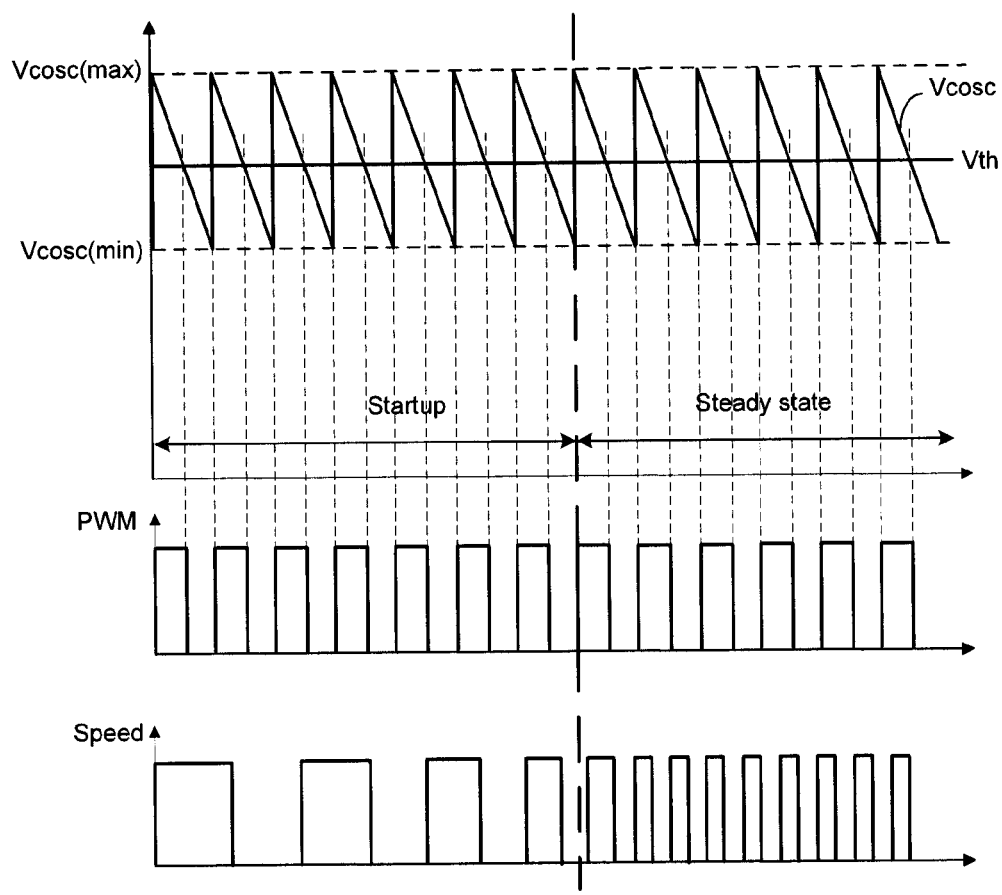
FIG. 4 shows the waveforms of signals in a conventional system with a control signal PWM having a fixed duty cycle.
Figure 5:
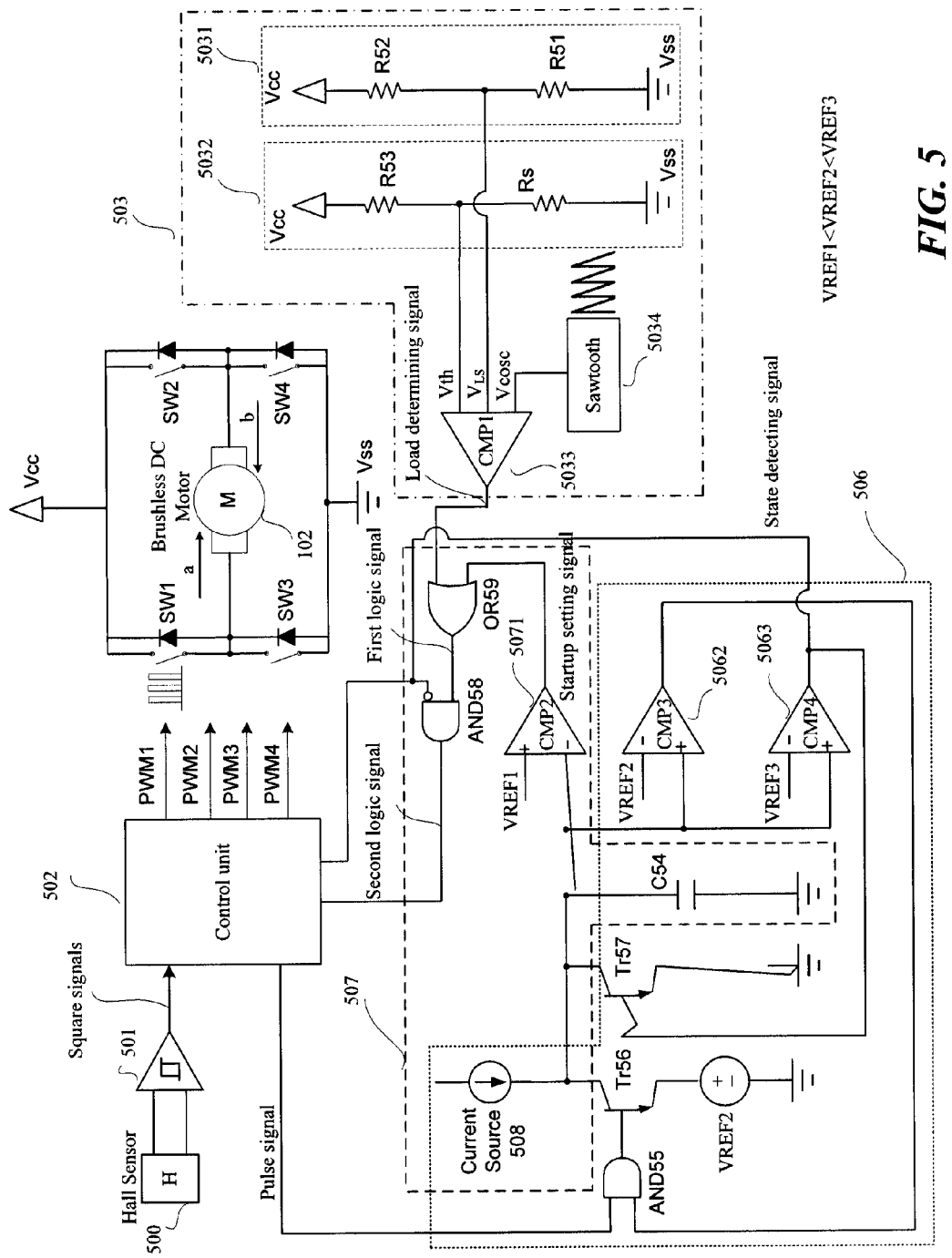
FIG. 5 schematically shows a drive and control circuit for a motor system in accordance with an embodiment of the present disclosure.
Figure 6:
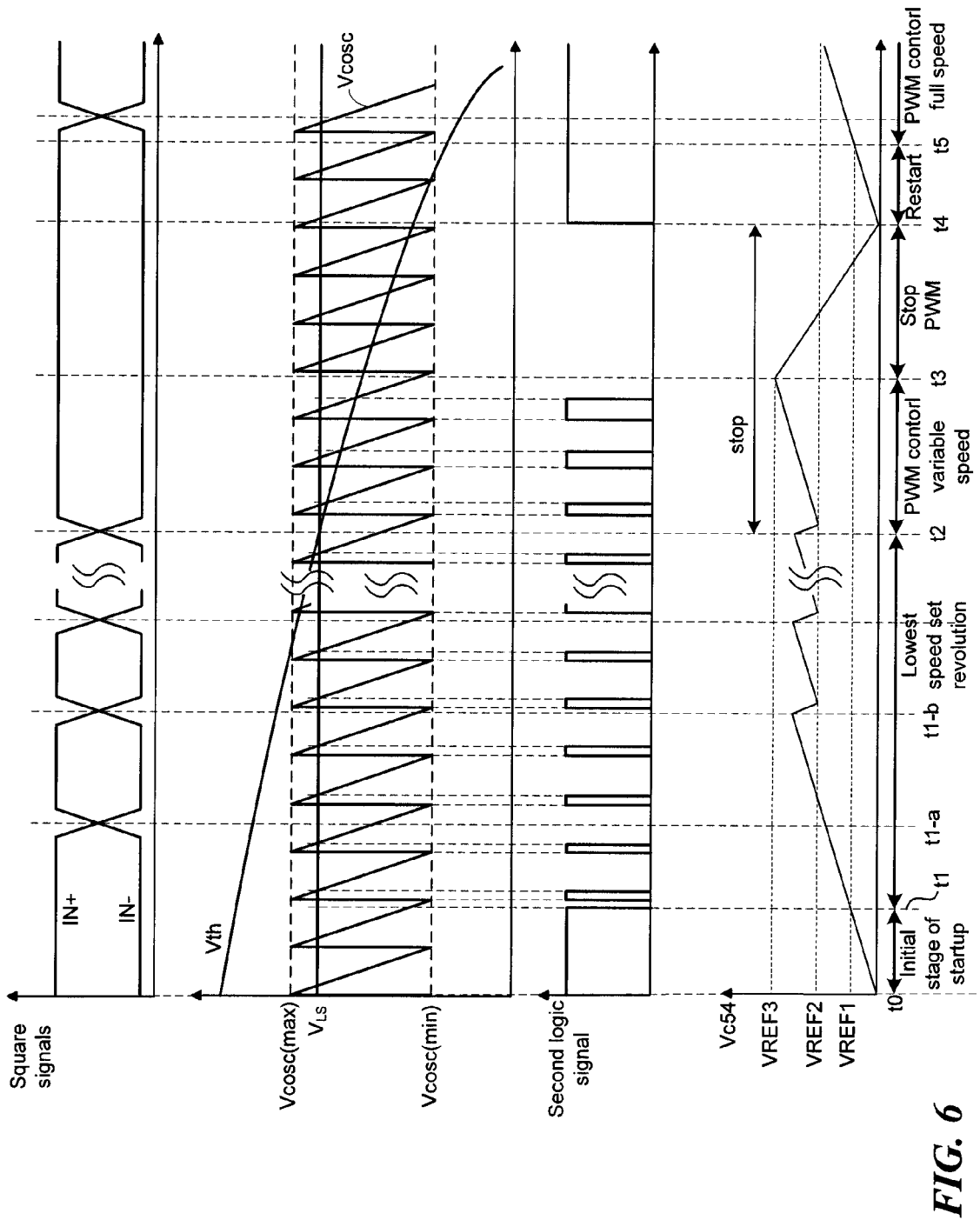
FIG. 6 schematically shows the waveforms of the signals in the circuit of FIG. 5.

FIG. 5 and FIG. 6 schematically show the improvement of the torque control during the system's start-up in accordance with embodiments of the present disclosure.

FIG. 5 schematically shows a drive and control circuit for a motor system in accordance with an embodiment of the present disclosure. The drive and control circuit comprises: a state detecting circuit 506 configured to detect the state (run/stop) of the motor system, to provide a state detecting signal based thereupon; a load determining circuit 503 configured to detect the ambient temperature of a fan driven by the motor system, to determine the load of the motor system and to generate a load determining signal based thereupon; a startup setting circuit 507 configured to generate a startup setting signal based on the operation of the motor system, and to generate a second control signal based on the startup setting signal, the load determining signal and the state detecting signal; a control unit 502 configured to control the operation of the motor system based on the state detecting signal and the second control signal. In one embodiment, the drive and control circuit for a motor system further comprises: a hall sensor 500 configured to generate two sine wave signals based on a position of a rotor to a coil in a motor system; and a comparator 501 configured to receive the sine wave signals, and to generate two square signals based on the two sine wave signals, wherein the two square signals are provided to the control unit 502 to change a direction of a current flowing through the motor system.

In one embodiment, the startup setting circuit 507 generates the startup setting signal based on the operation of the motor system, and thereby generates a second control signal based on the startup setting signal, the load determining signal and the state detecting signal, wherein the second control signal controls the operation of the motor system. The startup setting circuit 507 generates the startup setting signal when the motor system starts up, to make sure that the motor system starts up with a maximum torque.

In one embodiment, the startup setting circuit 507 comprises: a current source 508, a capacitor C54, a second comparator 5071, an AND gate AND58 and an OR gate OR59. The current source 508 is configured to charge the capacitor C54. The second comparator 5071 having a first input terminal (inverting terminal), a second input terminal (non-inverting terminal) and an output terminal, wherein the first input terminal is configured to receive a voltage Vc54 across the capacitor C54, the second input terminal is configured to receive a first reference signal VREF1, and wherein based on the comparison of the voltage Vc54 and the first reference signal VREF1, the second comparator 5071 generates the startup setting signal at the output terminal. When the voltage Vc54 is lower than the first reference signal VREF1, the startup setting signal is logical high; while when the voltage Vc54 is higher than the first reference signal VREF1, the startup setting signal is logical low.

The OR gate OR59 is configured to receive the startup setting signal and the load determining signal, and based on the startup setting signal and the load determining signal, the OR gate OR59 generates a first logic signal. The AND gate AND58 receives the first logic signal and the state detecting signal, and based on the first logic signal and the state detecting signal, the AND gate AND58 generates a second logic signal.

In one embodiment, the load determining circuit 503 comprises: a minimum limit circuit 5031 configured to generate a minimum signal $V_{LS}$; a load sensing circuit 5032 configured to detect the ambient temperature of the fan driven by the motor system, to generate a threshold signal Vth based on the ambient temperature; a first comparator 5033 having a first input terminal, a second input terminal and a third input terminal, wherein the first input terminal is configured to receive the threshold signal Vth, the second input terminal is configured to receive the minimum signal $V_{LS}$, and the third input terminal is configured to receive a sawtooth signal Vcosc, and wherein the first comparator 5033 generates the load determining signal based on the comparison of the sawtooth signal Vcosc with the lower one of the threshold signal Vth and the minimum signal $V_{LS}$.

In one embodiment, the minimum limit circuit 5031 comprises a first resistor R51 and a second resistor R52 coupled in series between the power supply Vcc and a ground node Vss. The minimum signal $V_{LS}$ is generated at the connection node of the first resistor R51 and the second resistor R52. Persons of ordinary skill in the art should know that the any suitable circuit for generating the minimum signal $V_{LS}$ could be used without detracting the merits of the present disclosure. The minimum signal $V_{LS}$ may have different values in different applications, as long as it is lower than the maximum withstanding voltage of the pin.

In one embodiment, the temperature sensing circuit 5032 comprises a thermal resistor Rs and a third resistor R53 coupled in series between the power supply Vcc and the ground node Vss, and the threshold signal Vth is generated at the connection node of the thermal resistor Rs and the third resistor R53. In one embodiment, the motor system is applied in a fan application. The fan is applied in a heat dissipation device for electrical equipment. When the electrical equipment gets hotter in the operation, the fan runs at a higher speed. In one embodiment, the thermal resistor Rs has negative temperature coefficient, and adheres to the fan to sense the ambient temperature. In normal operation, when the electrical equipment becomes hotter, the fan becomes hotter, too. Then the resistance of the thermal resistor Rs decreases, which causes the threshold signal Vth to decrease as shown in FIG. 6. Thus the threshold signal Vth reflects the ambient temperature of the fan. Persons of ordinary skill in the art should know that any suitable circuit which generates a signal reflecting the ambient temperature of the fan could be used without detracting the merits of the invention.

The first comparator 5033 compares the threshold signal Vth with the minimum signal $V_{LS}$, and sets the lower one as a load setting signal. The first comparator 5033 generates the load determining signal based on the comparison of the sawtooth signal Vcosc with the load setting signal. When the sawtooth signal Vcosc is higher than the load setting signal, the load determining signal is logical high.

In one embodiment, the state detecting circuit 506 comprises: the capacitor C54, the current source 508, a first NPN-type bipolar device Tr56, a second NPN-type bipolar device Tr57, a third comparator 5062, a fourth comparator 5063 and an AND gate AND55. The state detecting circuit 506 receives a pulse signal provided by the control unit 502. The pulse signal has pulses at the crossing point of the two square waveforms and reflects the state (run/stop) of the motor system. Based on the pulse signal, the state detecting circuit 506 generates the state detecting signal indicating the state (run/stop) of the motor system. The capacitor C54 is charged by the current source 508 and is discharged when either the first NPN-type bipolar device Tr56 or the second NPN-type bipolar device Tr57 is turned ON. The charging and discharging of the capacitor C54 results in a sawtooth voltage Vc54.

In one embodiment, the third comparator 5062 has an inverting input terminal, a non-inverting input terminal and an output terminal, wherein the inverting input terminal is configured to receive a second reference signal VREF2, the non-inverting input terminal of the comparator 5062 is configured to receive the voltage Vc54 across the capacitor C54, and wherein based on the voltage Vc54 and the second reference signal VREF2, the third comparator 5062 generates a comparison signal at the output terminal; a fourth comparator 5063 having a non-inverting input terminal, an inverting input terminal and an output terminal, wherein the non-inverting input terminal is configured to receive the voltage Vc54 across the capacitor, the inverting input terminal is configured to receive a third reference signal VREF3, and wherein based on the voltage Vc54 and the third reference signal VREF3, the fourth comparator 5063 generates the state detecting signal at the output terminal. The state detecting signal is provided to a base terminal of the NPN-type bipolar device Tr57, the startup setting circuit 507 and the control unit 502.

In one embodiment, the first reference signal VREF1, the second reference signal VREF2 and the third reference signal VREF3 have a following relationship:

VREF1<VREF2<VREF3

When the voltage Vc54 is higher than the second reference signal VREF2, the comparison signal generated by the third comparator 5062 is logical high, which turns on the NPN-type bipolar device Tr56. When the voltage Vc54 is higher than the third reference signal VREF3, the state detecting signal generated by the fourth comparator 5063 is logical high, which turns on the NPN-type bipolar device Tr57.

The bipolar device Tr56 has a base terminal, a collector terminal and an emitter terminal, wherein the emitter terminal is configured to receive the second reference signal VREF2, the collector terminal is coupled to the connection node of the current source 508 and the capacitor C54, and the base terminal is coupled to an output terminal of the AND gate AND55. The bipolar device Tr57 has a base terminal, a collector terminal and an emitter terminal, wherein the emitter terminal is connected to the ground node, the collector terminal is coupled to the connection node of the current source 508 and the capacitor C54, and the based terminal is configured to receive the state detecting signal generated by the fourth comparator 5063.

The AND gate AND55 is configured to receive the pulse signal generated by the control unit 502 and the comparison signal generated by the third comparator 5062.

In one embodiment, the motor 102 comprises a rotor and a coil. The hall sensor 500 is placed in a preset position which is in the midperpendicular of the magnetic pole of the coil. The hall sensor 500 generates a pair of sine wave signals based on the position of the rotor. The comparator 501 features a hysteretic characteristic and is configured to receive the pair of sine wave signals, wherein based on the sine wave signals, the comparator 501 generates two square signals IN+ and IN−. The two square signals IN+ and IN− are the communication signals and determines the direction of the current flowing through the motor.

The control unit 502 is configured to control the operation of the motor system based on the state detecting signal generated by the state detecting circuit 506 and the second control signal generated by the startup setting circuit 507.

The power stage comprises four switches SW1, SW2, SW3 and SW4. The control unit 502 provides control signals PWM1, PWM2, PWM3 and PWM4 to respectively control the switches SW1, SW2, SW3 and SW4. When the switches SW1 and SW4 are turned ON by the control signals PWM1 and PWM4, the switches SW2 and SW3 are turned OFF by the control signals PWM2 and PWM4, thus the current flowing through the motor flows in direction a as shown in FIG. 5; when the switches SW2 and SW3 are turned ON by the control signals PWM2 and PWM3, the switches SW1 and SW4 are turned OFF by the control signals PWM1 and PWM4, thus the current flowing through the motor flows in direction b as shown in FIG. 5. By alternatively changing the direction of the current flowing through the motor, the motor runs with a fixed direction.

In one embodiment, during when the current flowing through the motor flows in direction a, the switch SW4 stays ON and the switch SW1 is turned ON and OFF with a frequency of 25 kHz; and during when the current flowing through the motor flows in direction b, the switch SW3 stays ON and the switch SW2 is also turned ON and OFF with a frequency of 25 kHz.

FIG. 6 shows the waveforms of the signals in the circuit of FIG. 5. In FIG. 6, the two square signals IN+ and IN− are generated by the comparator 501; the threshold signal Vth is generated by the temperature sensing circuit 5032; the sawtooth signal Vcosc is generated by an oscillator 5034; the minimum signal $V_{LS}$ is generated by the minimum limit circuit 5031; Vcosc(max) and Vcosc(min) respectively represent the maximum value and the minimum value of the sawtooth signal Vcosc; PWM represents any one of the control signals PWM1, PWM2, PWM3 and PWM4 generated by the control unit 502; and Vc54 represents the voltage across the capacitor C54.

During subinterval t0~t1: the voltage Vc54 across the capacitor C54 is lower than the first reference signal VREF1, so the startup setting signal generated by the second comparator 5071 is logical high. As a result, the first logic signal generated by the OR gate OR59 is logical high during this period, which means that the signal PWM has the maximum duty cycle and the motor system will startup with the maximum torque.

During subinterval t1~t2 ($V_{LS}$<Vth): the voltage Vc54 increases. When the voltage Vc54 goes higher than the first reference signal VREF1, the startup setting signal generated by the second comparator 5071 is logical low. Then the first logic signal generated by the OR gate OR59 is determined by the load determining signal generated by the load determining circuit 503. The first comparator 5033 sets the lower one of the minimum signal $V_{LS}$ and the threshold signal Vth as the load setting signal, and compares the load setting signal with the sawtooth signal Vcosc. As shown in FIG. 6, the load determining signal is logical high when the sawtooth signal Vcosc is higher than the load setting signal, which is reflected by the waveform of signal PWM. The pulse signal generated by the control unit 502 may be blocked by the AND gate AND55 when the comparison signal generated by the comparator 5062 is logical low. For example, at time t1-a, the pulse signal is logical high because of the change of the current direction as seen from waveform of two square signals in FIG. 6. At this moment, the voltage Vc54 is lower than the second reference signal VREF2, so the comparison signal generated by the second comparator 5062 is logical low. Thus the logical high pulse signal is blocked and the signal generated by the AND gate AND55 is logical low, and the voltage Vc54 keeps increasing. At time t1-b, the pulse signal is again logical high. At this moment, the voltage Vc54 is higher than the second reference signal VREF2, so the comparison signal generated by the second comparator 5062 is logical high. Then the signal generated by the AND gate AND55 is logical low, and the bipolar device Tr56 is turned ON. The capacitor C54 is discharged and the voltage Vc54 decreases to VREF2.

During time subinterval t2~t3 ($V_{LS}$>Vth): the ambient temperature increases, resulting in a decrease of the threshold signal Vth. When the threshold signal Vth is lower than the minimum signal $V_{LS}$, the minimum signal $V_{LS}$ is set as the load setting signal.

During time t2~t3, the load determining signal generated by the first comparator 5033 is logical high when the sawtooth signal Vcosc is higher than the load setting signal.

During subinterval t3~t4: the state detecting signal generated by the fourth comparator 5063 is provided to the base terminal of the bipolar device Tr57 and an input terminal of the AND gate AND58. If the motor system is forced to stop, the two square signals will remain unchanged as shown in FIG. 6. Then the pulse signal generated by the control unit 502 stays low, and the bipolar device Tr56 stays OFF. The voltage Vc54 increases to the third reference signal VREF3 at time t3 (as shown in FIG. 6). Then the state detecting signal becomes logical high and turns ON the bipolar device Tr57 to discharge the capacitor C54, as shown in the subinterval t3~t4.

During subinterval t4~t5: the capacitor C54 is discharged by the bipolar device Tr57 and the voltage Vc54 decreases to zero at time t4. From time t4, the load determining signal generated by the first comparator 5033 controls to drive the motor system again. Meanwhile, the capacitor C54 is charged again. When the voltage Vc54 is lower than the first reference signal VREF1, the comparison signal generated by the second comparator 5071 becomes logical high, and the motor system will restart with the maximum torque, as shown in the subinterval t4~t5 in FIG. 6.

During subinterval t>t5: when the voltage Vc54 is higher than the first reference signal VREF1, the startup setting signal is logical low and the load is determined by the load determining signal generated by the first comparator 5033, as shown in the subinterval t>t5 in FIG. 6. The threshold signal Vth decreases as the ambient temperature increases. The threshold signal Vth is lower than the minimum value Vcosc(min) of the sawtooth signal Vcosc during subinterval t>t5, so the duty cycle of the load determining signal is 100%.

Several embodiments of the foregoing drive and control circuit for a motor system provide better performance compared to conventional technique discussed above. Unlike the conventional technique, several embodiments of the drive and control circuit drive the motor system with a maximum torque during the startup period and the restart period, and the speed of the motor system is adjusted according to the load during normal operation. In addition, the drive and control circuit is simplified and may be integrated. Furthermore, several embodiments of the drive and control circuit need fewer external components (only circuit 5031 and circuit 5032 are needed), so the cost is down.

An effective technique for drive and control the motor system has been disclosed. While specific embodiments of the present disclosure have been provided, it is to be understood that these embodiments are for illustration purposes and not limiting. Many additional embodiments will be apparent to persons of ordinary skill in the art by reading this disclosure.

We claim:

1. A drive and control circuit for a motor system, wherein the motor system comprises a rotor, a coil and a bridge circuit, the drive and control circuit comprising:
   a control unit configured to generate a plurality of control signals to control the bridge circuit and to generate a pulse signal indicative of the position of the rotor;
   a state detecting circuit coupled to the control unit to receive the pulse signal, and based on the pulse signal, the state detecting circuit generates a state detecting signal indicative of the state of the motor system, wherein the state of the motor system comprises a running state and a stop state;
   a load determining circuit configured to detect an ambient temperature and to generate a load determining signal based on the detected ambient temperature; and
   a minimum limit circuit configured to generate a minimum signal;
   a load sensing circuit configured to sense a load of the motor system, and to generate a threshold signal indicative of the load of the motor system; and
   a first comparator having a first input terminal, a second input terminal, a third input terminal and an output terminal, wherein the first input terminal is configured to receive the threshold signal, the second input terminal is configured to receive the minimum signal, and the third input terminal is configured to receive a sawtooth signal, and wherein based on the threshold signal, the minimum signal and the sawtooth signal, the first comparator generates the load determining signal at the output terminal; and a startup setting circuit configured to receive the state detecting signal and the load determining signal, and to generate a second logic signal based on the state detecting signal and the load determining signal;

wherein the control unit receives the state detecting signal and the second logic signal, and generates the plurality of control signals based on the state detecting signal and the second logic signal.

2. The drive and control circuit for motor system of claim 1 further comprising:

a position sensor configured to generate two square signals based on the relative position of the rotor to the coil;

wherein the control unit generates a pulse signal based on the two square signals.

3. The drive and control circuit for motor system of claim 2, wherein the position sensor comprises:

a hall sensor coupled between a power supply and a ground node, wherein the hall sensor has two output terminals, and based on the relative position of the rotor to the coil, the hall sensor generates two sine wave signals at the output terminals, and wherein the two sine wave signals having the same magnitudes but opposite phases.

4. The drive and control circuit for motor system of claim 2, wherein the load determining circuit comprises:

a minimum limit circuit configured to generate a minimum signal;

a temperature sensing circuit configured to sense an ambient temperature, and to generate a threshold signal indicative of the ambient temperature; and a first comparator having a first input terminal, a second input terminal, a third input terminal and an output terminal, wherein the first input terminal is configured to receive the threshold signal, the second input terminal is configured to receive the minimum signal, and the third input terminal is configured to receive a sawtooth signal, and wherein based on the threshold signal, the minimum signal and the sawtooth signal, the first comparator generates the load determining signal at the output terminal.

5. The drive and control circuit for motor system of claim 4, wherein when the threshold signal is lower than the minimum signal, the first comparator compares the sawtooth signal with the threshold signal; and when the threshold signal is larger than the minimum signal, the first comparator compares the sawtooth signal with the minimum signal.

6. The drive and control circuit for motor system of claim 4, wherein the temperature sensing circuit comprises a thermal resistor and a third resistor, and wherein the third resistor and the thermal resistor is series coupled between a power supply and a ground node, and the threshold signal is generated at the connection node of the thermal resistor and the third resistor.

7. The drive and control circuit for motor system of claim 6, wherein the thermal resistor has a negative temperature coefficient.

8. The drive and control circuit for motor system of claim 2, wherein the startup setting circuit comprises:

a capacitor having a first terminal and a second terminal, wherein the second terminal is connected to the ground node;

a current source coupled between the power supply and the first terminal of the capacitor to supply current to the capacitor; and a second comparator having a first input terminal, a second input terminal and an output terminal, wherein the first input terminal is configured to receive the voltage across the capacitor, the second input terminal is configured to receive a first reference signal, and wherein based on the voltage across the capacitor and the first reference signal, the second comparator generates the startup setting signal at the output terminal.

9. The drive and control circuit for motor system of claim 8, wherein the startup setting circuit further comprises:

a first logic unit having a first input terminal, a second input terminal and an output terminal, wherein the first input terminal is configured to receive the load determining signal, the second input terminal is configured to receive the startup setting signal, and wherein based on the load determining signal and the startup setting signal, the first logic unit generates a first logic signal at the output terminal; and an second logic unit having a first input terminal, a second input terminal and an output terminal, wherein the first input terminal is configured to receive the state detecting signal, the second input terminal is configured to receive the first logic signal, and wherein based on the state detecting signal and the first logic signal, the second logic unit generates the second logic signal at the output terminal.

10. The drive and control circuit for motor system of claim 9, wherein:

the first logic unit comprises an OR gate; and
the second logic unit comprises an AND gate.

11. The drive and control circuit for motor system of claim 8, wherein the state detecting unit comprises:

the capacitor;
the current source;
a third comparator having a first input terminal, a second input terminal and an output terminal, wherein the first input terminal is configured to receive the voltage across the capacitor, the second input terminal is configured to receive a second reference signal, and wherein based on the voltage across the capacitor and the second reference signal, the third comparator generates a comparison signal at the output terminal; and a fourth comparator having a first input terminal, a second input terminal and an output terminal, wherein the first input terminal is configured to receive the voltage across the capacitor, the second input terminal is configured to receive a third reference signal, and wherein based on the voltage across the capacitor and the third reference signal, the fourth comparator generates the state detecting signal at the output terminal.

12. The drive and control circuit for motor system of claim 11, wherein the state detecting unit further comprises:

a third logic unit having a first input terminal, a second input terminal and an output terminal, wherein the first input terminal is configured to receive the pulse signal, the second input terminal is configured to receive the comparison signal generated by the third comparator, and wherein based on the pulse signal and the comparison signal, the third logic unit generates a third logic signal;

a first switch having a first terminal, a second terminal and a control terminal, wherein the first terminal is coupled to the first terminal of the capacitor, the second terminal is connected to the ground node, and the control terminal is configured to receive the third logic signal; and a second switch having a first terminal, a second terminal and a control terminal, wherein the first terminal is coupled to the first terminal of the capacitor, the second terminal is connected to the ground node, and the control terminal is configured to receive the state detecting signal.

13. The drive and control circuit for motor system of claim 12, wherein the third logic unit comprises an AND gate.

14. A drive and control method for a motor system, wherein the motor system comprises a rotor, a coil and a bridge circuit, comprising:
- generating a state detecting signal based on the state of the motor system, wherein the state of the motor system comprising a running state and a stop state;
- generating a load determining signal based on an ambient temperature;
- generating a startup setting signal when the motor system starts up;
- generating a second logic signal based on the state detecting signal, the load determining signal and the startup setting signal; and
- generating control signals to control the bridge circuit of the motor system based on the second logic signal and the state detecting signal:, generating position signals based on the relative position of the rotor to the coil;
- generating a pulse signal based on the position signals;
- generating a minimum signal to set a lowest speed of the motor system;
- generating a threshold signal indicative of the load of the motor; and
- generating the load determining signal based on a sawtooth signal, the minimum signal and the threshold signal, wherein the duty cycle of the load determining signal is determined by comparing the sawtooth signal to the smaller value of the minimum signal and the threshold signal.

15. The drive and control method for motor system of claim 14, wherein generating a startup setting signal comprises:
- charging a capacitor by a current source; and
- comparing a voltage across the capacitor with a first reference signal to generate the startup setting signal.

16. The drive and control method for motor system of claim 14, wherein generating a state detecting signal comprises:
- charging a capacitor by a current source; and
- comparing the voltage across the capacitor to a third reference signal to generate the state detecting signal.

17. The drive and control method for motor system of claim 16, wherein generating a state detecting signal further comprises:
- comparing the voltage across the capacitor to a second reference signal to generate a comparison signal;
- generating a third logic signal based on the comparison signal and the pulse signal;
- discharging the capacitor based on the third logic signal; and
- discharging the capacitor based on the state detecting signal.

* * * * *